United States Patent
Klitzsch et al.

(10) Patent No.: US 11,053,165 B2
(45) Date of Patent: Jul. 6, 2021

(54) REFRACTORY CERAMIC PRODUCT, BATCH FOR THE MANUFACTURE SUCH A PRODUCT AND METHOD FOR MANUFACTURING SUCH A PRODUCT

(71) Applicant: Refractory Intellectual Property GmbH & Co. KG, Vienna (AT)

(72) Inventors: Michael Klitzsch, Leoben (AT); Martin Geith, Leoben (AT); Friedrich Kahr, Veitsch (AT); Sandra Königshofer, St. Lorenzen (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 0 days.

(21) Appl. No.: 16/338,490

(22) PCT Filed: Aug. 23, 2017

(86) PCT No.: PCT/EP2017/071200
§ 371 (c)(1),
(2) Date: Mar. 31, 2019

(87) PCT Pub. No.: WO2018/091156
PCT Pub. Date: May 24, 2018

(65) Prior Publication Data
US 2020/0039885 A1 Feb. 6, 2020

(30) Foreign Application Priority Data

Nov. 17, 2016 (EP) ..................................... 16199243

(51) Int. Cl.
| *C04B 35/04* | (2006.01) |
| *C04B 35/10* | (2006.01) |
| *C04B 35/057* | (2006.01) |
| *C04B 35/14* | (2006.01) |
| *C04B 35/626* | (2006.01) |

(52) U.S. Cl.
CPC ............ *C04B 35/04* (2013.01); *C04B 35/057* (2013.01); *C04B 35/10* (2013.01); *C04B 35/14* (2013.01); *C04B 35/626* (2013.01); *C04B 2235/3201* (2013.01); *C04B 2235/3274* (2013.01); *C04B 2235/42* (2013.01); *C04B 2235/96* (2013.01)

(58) Field of Classification Search
CPC ...... C04B 35/04; C04B 35/043; C04B 35/443
See application file for complete search history.

(56) References Cited

U.S. PATENT DOCUMENTS

| 3,199,995 | A | * | 8/1965 | King | C04B 35/043 |
| | | | | | 501/111 |
| 3,786,129 | A | * | 1/1974 | Kawabe | C04B 35/04 |
| | | | | | 423/170 |
| 3,879,208 | A | | 4/1975 | Cassens, Jr. | |
| 4,780,434 | A | * | 10/1988 | Watanabe | B22D 41/32 |
| | | | | | 501/120 |
| 2010/0151232 | A1 | * | 6/2010 | Cabodi | F28F 21/04 |
| | | | | | 428/337 |
| 2015/0353427 | A1 | * | 12/2015 | Jorge | C04B 35/109 |
| | | | | | 501/104 |

FOREIGN PATENT DOCUMENTS

| CA | 686668 A | 5/1964 |
| DE | 1927750 A1 | 12/1970 |
| DE | 1571601 B1 | 4/1971 |
| EP | 2995596 A1 | 3/2016 |
| WO | 2008091041 A1 | 7/2008 |

OTHER PUBLICATIONS

Ceramic, Wikipedia, downloaded Jan. 15, 2021 (Year: 2021).*
"International Search Report for PCT Patent Application No. PCT/EP2017/071200", dated Oct. 23, 2017, 7 Pages.
"Written Opinion of the International Searching Authority for PCT Patent Application No. PCT/EP2017/071200", dated Oct. 23, 2017, 15 Pages.
Siadati, et al., "Acidic and Basic Binders for Magnesite Based Aggregate in Plaster of Tundish", In Ceramics International, vol. 5, No. 7, Sep. 1, 2009, pp. 2845-2852.

* cited by examiner

*Primary Examiner* — Karl E Group
(74) *Attorney, Agent, or Firm* — Medley, Behrens & Lewis, LLC

(57) ABSTRACT

The invention relates to a fire-resistant ceramic product, a batch for manufacturing a product of said type, and a process for manufacturing a product of said type.

10 Claims, No Drawings

REFRACTORY CERAMIC PRODUCT, BATCH FOR THE MANUFACTURE SUCH A PRODUCT AND METHOD FOR MANUFACTURING SUCH A PRODUCT

The invention concerns a refractory ceramic product, a batch for the manufacture of such a product and a method for the manufacture of such a product.

The term "refractory ceramic product" in the meaning of the invention refers in particular to refractory products with an operating temperature of more than 600° C. and preferably refractory materials in accordance with DIN 51060: 2000-6, i.e. materials with a pyrometric cone equivalent greater than SK 17. The pyrometric cone equivalent can be determined in particular in accordance with DIN EN 993-12: 1997-06.

As is well known, a "refractory ceramic batch" denotes a composition of one or more components or raw materials by which a refractory ceramic product can be manufactured by means of a temperature treatment, i.e. in particular by means of a ceramic firing.

The present invention concerns a basic refractory ceramic product, specifically a basic refractory ceramic product based on MgO (magnesium oxide, mineralogical 'periclase').

Such basic refractory ceramic products based on MgO have generally proved themselves as refractory ceramic products for high-temperature applications. In particular, such MgO products are used for refractory lining of aggregates in the metal industry, for example in continuous casting plants, as well as in glass melting furnaces or in kilns of the non-metal industry, for example in tunnel or rotary kilns, for refractory lining.

While such MgO-based products are highly refractory when used at high temperatures, they may be damaged during storage and transport. This is because the MgO in such products tends to hydrate and can react with moisture to form magnesium hydroxide, $Mg(OH)_2$, which causes such products to crack and decompose when exposed to prolonged moisture.

It is therefore well known to protect refractory ceramic products based on MgO against such hydration, for example by impregnating them with bitumen or paraffin. Such an impregnation is, however, associated with considerable costs on the one hand and leads on the other hand to a volatilization of components of the impregnation when heating the impregnated products during their application, which is associated with considerable smoke development and odour nuisance and is therefore generally undesirable.

However, this does not guarantee lasting protection of the products against hydration, since such impregnation only protects the products superficially. Moisture penetrating into the volume of the product may therefore continue to hydrate the magnesia in the product.

In addition, impregnation may alter the refractory properties of the product and, in particular, its fire resistance.

The present invention is based on the object of offering a refractory ceramic product based on MgO which is protected against hydration. Another object of the invention is to provide such a refractory ceramic product based on MgO that is protected against hydration and at the same time has no deteriorated properties compared to a product not protected against hydration, in particular no deteriorated refractory properties. In particular, the invention is also based on the object of providing a product which does not give rise to smoke or odours when heated. A further object is to provide a batch for the manufacture of such a product. Finally, one of the tasks of the invention is to provide a method for the manufacture of such a product.

According to the invention, a refractory ceramic product comprising the following features is provided to solve the problem:

The product has a ceramic bond;

the product has a proportion of MgO of at least 75% by mass;

the product has a proportion of sulphur in the range from 0.01 to 0.20% by mass.

The aforementioned data presented in % by mass indicate the percentage by mass of the respective component in relative to the total mass of the product.

The invention is based on the surprising basic knowledge that refractory ceramic products based on MgO are effectively protected against hydration of the MgO in the product, provided that the total sulphur proportion in the product is present in a very specific proportion by mass. According to the invention, this specific mass fraction of total sulphur in the product has been found to be in the range of 0.01 to 0.20% by mass. In accordance with the invention, it has been found that sulphur cannot suppress the hydration of MgO in the product if sulphur is present in the product below 0.01 mass %. It has also been shown that the refractory properties of the product may be impaired if the sulphur proportion in the product exceeds 0.20% by mass. For example, sulphur may form low-melting phases with other constituents of the product during the application of the same, which may considerably reduce the temperature resistance, in particular its hot strength, if sulphur is present in the product in a proportion above 0.20% by mass.

In accordance with the invention, it has been turned out that the hydration protection by sulphur can be further improved and any adverse influence of sulphur on the product can be prevented even better if the proportion of sulphur in the product is approached to an even more specific range of 0.01 to 0.05% by mass. In this respect, it may also be provided, for example, that sulphur is present in the product in a proportion not exceeding 0.20% by mass, 0.15% by mass, 0.10% by mass or 0.05% by mass. In this respect, it may be preferred, for example, that the product has a sulphur content in the range from 0.01 to 0.15% by mass, further preferred in the range from 0.01 to 0.10% by mass and particularly preferred in the range from 0.01 to 0.05% by mass.

The aforementioned data given for the proportion of sulphur in the product are based on the total mass of the product.

The information given herein on the proportion of sulphur in the product or batch according to the invention is the content of total sulphur in the product or batch determined in accordance with method B (IR detection after combustion) in accordance with DIN 51085: 2015-01. This determination method is based on the reaction of the material to be analyzed with oxygen in an inductively heated crucible and subsequent infrared detection of the $SO_2$ concentration in the carrier gas volume. The proportion of sulphur is indicated as elemental sulphur (S), this being the case as well in view of the invention with regard to the product in accordance with the invention and the batch in accordance with the invention. Furthermore, sulphur in the sense of the invention is not necessarily free sulphur, but also, for example, sulphur in bound form.

According to the invention, it is provided that the sulphur is present throughout the volume of the product and in particular throughout the entire volume of the product. This ensures that the product is effectively protected against hydration of the MgO over its entire volume. In order to achieve such a distribution of the sulphur over the volume of the product, it is provided that during the manufacture of the product a sulphur comprising component is introduced into the batch and mixed with the other components or raw materials of the batch so that the sulphur is distributed over the volume of the batch and the refractory ceramic product made from it.

It may be provided that the sulphur is not homogeneously distributed over the volume of the product. In particular, there may be a gradient in the product with regard to the proportion of sulphur. For example, the proportion of sulphur may increase from the peripheral areas of the product, for example from the external surfaces of the product, to the internal area of the product. This may, for example, be due to the fact that during the ceramic firing of the product, the sulphur content of the sulphur component of the batch from which the product is made has volatilized more in the peripheral areas than in the inner area of the product. The proportion of sulphur in the product according to the invention therefore represents mean values, wherein it is preferably provided that there are no areas, in particular no macroscopic areas, in the product according to the invention in which the proportion of sulphur lies outside, in particular not substantially outside, the proportion of sulphur in the product according to the invention.

Since it is not necessary to impregnate the product to protect it against hydration of the MgO in the product, no smoke or odour is produced when the product is used as a result of the evaporation of such an impregnation.

The product according to the invention has a proportion of MgO of at least 75% by mass, i.e. for example also a proportion of MgO of at least 80% by mass. Furthermore, the product may contain, for example, a maximum proportion of MgO of 97% by mass, i.e. a maximum 95% or 92% by mass. In this respect, the product can, for example, have a proportion of MgO in the range from 75 to 97% by mass, i.e. also in the range from 80 to 95% by mass or in the range from 80 to 92% by mass.

The aforementioned data, on the mass fraction of MgO in the product are in each case related to the total mass of the product.

Insofar as information is given here on the proportions of oxides in the article, in particular on the proportions of the oxides MgO, $Al_2O_3$, CaO, $SiO_2$, $Fe_2O_3$, $K_2O$ or $Na_2O$, these oxides need not be present in the product in pure form. Rather, these oxides may be present in the product in pure form and/or in bonded form. For example, MgO may be present in the article as pure MgO (periclase) and/or as magnesia spinel ($MgO.Al_2O_3$). Furthermore, the oxide $Al_2O_3$, for example, may be present in the product as pure $Al_2O_3$ (corundum) or as magnesia spinel.

The refractory product according to the invention is a ceramic product, i.e. a product with a ceramic bond. It is known that such a ceramic bond is produced by sintering the product during firing. The product according to the invention is therefore a ceramic, i.e. sintered refractory product.

The product may have a proportion of $Al_2O_3$ in the range from 1 to 20% by mass. In this respect, the product may, for example, contain at least 1, 2, 3, 4 or 5% by mass of $Al_2O_3$. In addition, the article may, for example, contain not more than 20, 19, 18, 17 or 16% by mass of $Al_2O_3$. In this respect, the product may also contain, for example, a proportion of $Al_2O_3$ in the range from 3 to 18% by mass or in the range from 5 to 16% by mass.

The product may have a proportion of CaO in the range 0.5 to 3.0% by mass, i.e. for example also a proportion of CaO of at least 0.6 or 0.7% by mass and for example also a proportion of CaO of at most 3.0% by mass, 2.9% by mass, 2.8% by mass, 2.7% by mass, 2.6% by mass or 2.5% by mass. In this respect, the product may also contain, for example, a proportion of CaO in the range from 0.6 to 2.8% by mass or in the range from 0.7 to 2.5% by mass.

The product may have a proportion of $SiO_2$ less than 1.5% by mass, i.e. for example less than 1.0% by mass. In this respect, the product may, for example, have a proportion of $SiO_2$ in the range from 0.1 to 1.5% by mass or in the range from 0.3 to 1.5% by mass.

The product may have a proportion of $Fe_2O_3$ less than 10% mass, i.e. for example a proportion of $Fe_2O_3$ less than 5 or less than 3% by mass. In this respect, the product may, for example, have a proportion of $Fe_2O_3$ in the range from 0.1 to 10 mass %, in the range from 0.1 to 5 mass % or in the range from 0.1 to 3 mass %.

The product may have a proportion of $Na_2O$ less than 0.5% by mass, i.e. for example, have a proportion of $Na_2O$ less than 0.1 or less than 0.05% by mass. For example, the product may have a have a proportion of $Na_2O$ in the range from 0.01 to 0.5% by mass or in the range from 0.01 to 0.1% by mass.

The product may have a proportion of $K_2O$ less than 0.2% by mass, i.e. for example, also a proportion of $K_2O$ less than 0.1% by mass. For example, the product may have a proportion of $K_2O$ in the range from 0.01 to 0.1% by mass.

The product may have a proportion of the total mass of $Na_2O$ and $K_2O$ below 0.5% by mass, i.e. for example also a proportion below 0.2 or 0.1% by mass. For example, the proportion of the total mass of $Na_2O$ and $K_2O$ in the product may be in the range from 0.01 to 0.5% by mass.

The aforementioned data for mass proportion of MgO, $Al_2O_3$, CaO, $SiO_2$, $Fe_2O_3$, $Na_2O$ and $K_2O$ in the product are in each case related to the total mass of the product.

In addition to the substances described above, i.e. MgO, $Al_2O_3$, CaO, $SiO_2$, $Fe_2O_3$, $Na_2O$ and $K_2O$ and sulphur, the product according to the invention may contain other substances, for example, in a proportion of less than 5% by mass, i.e. also in a proportion of less than 4, 3, 2 or 1% by mass, in relation to the total mass of the product.

According to one embodiment it is provided that the proportion of $Cr_2O_3$ of in the product is less than 5% by mass, i.e. for example also less than 4, 3, 2 or 1% by mass, in each case in relation on the total mass of the product.

According to one embodiment, it is provided that the proportion of free carbon in the product is less than 3% by mass, i.e. for example also less than 2 or less than 1% by mass, in each case in relation to the total mass of the product.

The object of the invention is also a batch for the manufacture of a product according to the invention, comprising the following features:

A basic component comprising one or more raw materials based on magnesia;

a component comprising sulphur comprising one or more raw materials comprising sulphur;

the batch has a proportion of MgO of at least 75% by mass;

the batch has a proportion of sulphur such that a refractory ceramic product that can be fired from the batch has a proportion of sulphur according to the refractory ceramic product according to the invention.

The basic component of the batch may comprise one or more of the following raw materials based on magnesia: sintered magnesia, fused magnesia, sintered doloma or fused doloma. The basic component preferably comprises a raw material based on magnesia in the form of sintered magnesia.

In addition to raw materials based on magnesia, the basic component may comprise one or more further raw materials, in particular one or more raw materials comprising alumina ($Al_2O_3$), in particular one or more of the following raw materials comprising alumina: magnesia spinel, sintered corundum, fused alumina, calcined alumina, galaxite, hercynite or pleonast. The basic component may preferably comprise a raw material comprising alumina in the form of magnesia spinel.

Preferably the basic component comprises at least one of the raw materials sintered magnesia or magnesia spinel. The basic component preferably consists of at least one of the raw materials sintered magnesia or magnesia spinel. The basic component consists particularly preferably of the raw materials sintered magnesia and magnesia spinel.

The batch according to the invention may contain proportions of MgO, the further other oxides $Al_2O_3$, CaO, $SiO_2$, $Fe_2O_3$ and $Na_2O$ and any further substances according to the product according to the invention. In this respect, the remarks previously made with respect to the proportions of these substances in the product according to the invention shall apply correspondingly to the proportions of these substances in the batch according to the invention. The batch may contain proportions of $K_2O$ which are higher than the proportions of $K_2O$ in the product, since proportions of $K_2O$ may volatilize during the firing of the batch. In this respect, it may be provided that the batch has a proportion of $K_2O$ less than 2.5% by mass, i.e. for example also a proportion of $K_2O$ less than 2.0% by mass, less than 1.0% by mass or less than 0.4% by mass. For example, the batch may have a proportion of $K_2O$ in the range from 0.01 to 2.5% by mass, i.e. for example also a proportion of $K_2O$ in the range from 0.01 to 1.0% by mass.

The basic component of the batch is present in the batch in such a way or is composed in such a way that the batch has the proportions of the aforementioned oxides in accordance with the invention. Since in particular raw materials based on magnesia and alumina, in particular sintered magnesia and magnesia spinel, in addition to the main oxides MgO and $Al_2O_3$ regularly also have proportions of one or more of the oxides CaO, $SiO_2$, $Fe_2O_3$, $1K_2O$ and $Na_2O$, the skilled person is easily in a position to assemble the raw materials to a batch according to the invention in such a way that the batch all in all comprises the proportions of these oxides according to the invention. However, raw materials on magnesia and alumina, in particular sintered magnesia and magnesia spinel, do not regularly have any sulphur content which would make it possible to make up a mixture which has such a proportion of sulphur that a refractory ceramic product could be fired from it which has the proportion of sulphur in accordance with the invention. Therefore, according to the invention it is provided that the batch according to the invention has a component comprising sulphur which comprises one or more raw materials comprising sulphur. This sulphur comprising component makes it possible to achieve such proportions of sulphur in the batch that a refractory ceramic product can be fired from the batch according to the invention, which has the proportions of sulphur according to the invention. For this purpose, the sulphur comprising component—depending on the concentration of sulphur in this component—is added in corresponding proportions to the batch.

While the batch according to the invention is fired to a refractory ceramic product, fractions of the sulphur in the batch pass into the gas phase and volatilize, so that these fractions are subsequently no longer available to provide a fired refractory ceramic product with the proportions of sulphur according to the invention. In accordance with the invention, it has been found that up to more than 80% by mass, in particular more than 90% by mass, in particular 90 to 98% by mass, relative to the total mass of sulphur in the batch, of the sulphur present in the batch can volatilize during the firing.

To this extent, it is provided for in accordance with the invention that the batch contains such a proportion of sulphur that a refractory ceramic product, that can be fired from the batch, comprises such a proportion of sulphur such as the refractory ceramic product disclosed herein, i.e. in the most general embodiment a proportion of sulphur in the range from 0.01 to 0.20% by mass. The exact proportion of sulphur that must be present in the batch in order to fire a refractory ceramic product with a proportion of sulphur, such as contained in the refractory ceramic product disclosed herein, can be easily determined by the skilled person by calculation or experiment. According to one embodiment it is provided that the batch—in order to achieve such a proportion of sulphur in the refractory ceramic product—has a proportion of sulphur in the range from 0.02 to 0.9% by mass, based on the total mass of the batch. A product in accordance to the invention with the proportion of sulphur according to the invention can be fired particularly advantageously from the batch if the batch has a proportion of sulphur in the range from 0.03 to 0.5% by mass and particularly advantageously if it has a proportion of sulphur in the range from 0.06 to 0.3% by mass. In this respect, it may also be provided, for example, that the batch has a maximum proportion of sulphur of 0.9% by mass, 0.7% by mass, 0.5% by mass, 0.4% by mass or 0.3% by mass and, for example, a minimum proportion of sulphur of 0.02% by mass, 0.03% by mass, 0.04% by mass, 0.05% by mass or 0.06% by mass.

According to a particularly preferred embodiment it is provided that the sulphur comprising component comprises at least one sulphur comprising raw material in the form of a used refractory ceramic product. Such a used refractory ceramic product may in particular be one or more of the following used refractory ceramic products: A used lining of a rotary cement kiln or a used lining of a regenerator of a glass tank.

It is known that gaseous substances are produced during the firing process in rotary kilns for burning cement clinker ("rotary cement kilns") or in furnaces for melting and treating glass ("glass tanks"), which penetrate the refractory lining of the rotary cement kiln or the regenerator of the glass tank and condense as substances comprising sulphur, in particular as alkali sulphates, for example as potassium sulphate ($K_2SO_4$) or sodium sulphate ($Na_2SO_4$). In accordance with the invention, it has now surprisingly turned out that such a used brick lining comprising sulphur can be used as a raw material to adjust the proportion of sulphur in a batch according to the invention for the manufacture of a product according to the invention. A refractory lining of a cement rotary kiln has proved to be particularly advantageous. Therefore, according to a preferred embodiment, the component comprising sulphur comprises a raw material comprising sulphur in the form of a used lining of a rotary cement kiln. According to one embodiment it is provided that the sulphur comprising component consists of a used lining of a cement rotary kiln. The used lining of a cement rotary kiln can be in particular one based on MgO, in particular with a proportion of MgO of at least 75% by mass or of at least 80% by mass. Furthermore, the used lining may, for example, contain a maximum proportion of MgO of 97% by mass, i.e. for example also a maximum proportion of MgO of 95 or 92% by mass. Furthermore, the used lining may contain, for example, a proportion of MgO in the range from 75 to 97% by mass, i.e. for example also in the range from 80 to 95% by mass or in the range from 80 to 92% by mass. The aforementioned data on the mass proportion of MgO in the used lining are in each case related to the mass of the lining.

For example, the basic component can be present in the batch according to the invention in a proportion of at least 50% by mass, i.e. for example also in a proportion of at least 60, 70, 80, 90, 95 or 99% by mass. Furthermore, it can be provided, for example, that the basic component is present in the batch in a proportion of at most 99% by mass, i.e. for example also in a proportion of at most 95, 90, 80, 70 or 60% by mass. In this respect, the basic component may be present in the batch, for example, in a proportion in the range from 50 to 99% by mass, preferably also in a proportion in the range from 60 to 90% by mass and particularly preferably in a proportion in the range from 60 to 80% by mass.

The basic component is preferably present in the batch with a maximum grain size of 5 mm. For example, it can be provided that at least 90% by mass of the basic component, relative to the total mass of the basic component, is present in the batch with a grain size of at most 5 mm, determined in accordance with DIN EN 933-1:2012-03.

The component comprising sulphur, for example in the form of a used lining of a cement rotary kiln, can, for example, be present in a proportion of at least 1% by mass in the batch, i.e. for example also in a proportion of at least 5, 10, 20, 30 or 40% by mass. It may also be provided that the component comprising sulphur is present in the batch in a proportion of at most 60% by mass, i.e. for example also in a proportion of at most 50% by mass or 40% by mass. In particular, the component comprising sulphur may be present in the batch in a proportion in the range from 1 to 60% by mass, particularly preferred in a proportion in the range from 10 to 40% by mass and particularly preferred in a proportion in the range from 20 to 40% by mass.

The component comprising sulphur is preferably present in the batch in a grain size of maximum 5 mm. For example, it may be provided that at least 90% by mass of the sulphur comprising component, relative to the total mass of the basic component, is present in the batch with a grain size of at most 5 mm, determined in accordance with DIN EN 933-1:2012-03.

In addition to the basic component and the sulphur comprising component, the batch may also comprise one or more further components, preferably in proportions below 10% by mass, i.e. for example also in a proportion below 5% by mass or below 1% by mass.

The data previously given on the batch, in particular the data on sulphur contents in the batch, refers to the batch without any binders that can be added to the batch. Preferably, it may be provided to add at least one usual binder to the batch in order to improve the workability of the batch or to give a green body formed from the batch sufficient green strength. In this respect, for example, a usual temporary binder can be added to the batch, for example lignosulphonate, for example in proportions of up to 5% by mass, in particular in proportions in the range of 1 to 5% by mass, in each case related to the total mass of the batch without the binder. To the extent that such binders, such as lignosulphonate for example, contain proportions of sulphur, these are of no significance for the manufacture of the product in accordance with the invention, since it has been shown in accordance with the invention that such proportions of sulphur in binders practically completely volatilize during the firing of the product to form a sintered refractory ceramic product. In this respect, it has been found that any sulphur content that such binders leave in the fired product is below an average of 0.01% sulphur by mass, relative to such a product. According to the invention, however, it has turned out that with such small proportions of sulphur the product is not protected against hydration by these sulphur proportions.

The object of the invention is also a method for the manufacture of a product according to the invention, comprising the following features:

Providing a batch in accordance with the invention;

Firing of the batch to a refractory ceramic product.

The firing of the batch is carried out in such a way that components of the batch, in particular the basic component, sinter together and thereby form a ceramic bond. After firing, a sintered, i.e. ceramic, refractory product is thus obtained.

In order to distribute the sulphur of the sulphur comprising component over the entire volume of the batch, it may in particular be provided that the batch is mixed before firing, in particular intimately mixed. For example, the batch may be mixed in a compulsory mixer. This can ensure that the sulphur of the sulphur comprising component is distributed over the entire volume of the batch and thus also over the entire volume of the product obtained from the batch.

The batch may be formed before firing, for example by pressing, or fired unshaped, i.e. used as an unshaped refractory product or as a so-called mass.

The firing is carried out at temperatures at which components of the batch sinter. For example, the batch can be fired at temperatures in the range from 1,400 to 1,800° C., especially at about 1,480° C.

The firing can, for example, be carried out for a duration in the range of three to twelve hours, in particular for about six hours.

Furthermore, the firing shall be carried out in such a way, in particular at such temperatures and for such duration, that the refractory ceramic product fired from the batch comprises a proportion of sulphur in accordance with the invention.

Further features of the invention result from the claims and the following example of the invention.

All features of the invention may be combined individually or in combination with each other.

An exemplary embodiment of the invention is explained in more detail below.

According to the exemplary embodiment, a batch was first provided that contained the following components in the following mass proportions:

A basic component consisting of sintered magnesia and magnesia spinel: 70% by mass; and a sulphur comprising component in the form of a used lining of a rotary cement kiln: 30% by mass.

Relative to the total mass of the batch, the sintered magnesia was present in the basic component in a proportion of 59% by mass and the magnesia spinel in a proportion of 11% by mass. The basic component was completely available in a grain size up to a maximum of 5 mm. The sintered magnesia comprised, related to the total mass of the sintered magnesia, a proportion of MgO of 96.80% by mass and a proportion of further oxides as follows: $Al_2O_3$: 0.04% by mass, $SiO_2$: 0.77% by mass; CaO: 2.21% by mass; $Fe_2O_3$: 0.18% by mass; $Na_2O$: 0.00% by mass; $K_2O$: 000% by mass;

sulphur (determined as elementary sulphur according to method B according to DIN 51085: 2015-01): 0.00% by mass.

Based on the total mass of the magnesia spinel, the magnesia spinel comprised a proportion of MgO of 32.70% by mass, a proportion of $Al_2O_3$ of 66.73% by mass and a proportion of other oxides as follows: $SiO_2$: 0.08% by mass; CaO: 0.28% by mass; $Fe_2O_3$: 0.21% by mass; $Na_2O$: 0.00% by mass; $K_2O$: 0.00% by mass; sulphur (determined as elementary sulphur according to method B according to DIN 51085: 2015-01): 0.00% by mass.

The used lining of a rotary cement kiln forming the sulphur comprising component was present in the form of magnesia bricks crushed to a grain size of less than 5 mm. In relation to the total mass of the sulphur comprising component, this component comprised, in addition to MgO in a proportion of 84.03% by mass and sulphur (determined as elementary sulphur according to method B in accordance with DIN 51085: 2015-01) in a proportion of 0.57% by mass, a proportion of further oxides as follows: $Al_2O_3$: 10.35% by mass, $SiO_2$: 0.56% by mass; CaO: 2.50% by mass; $Fe_2O_3$: 0.75% by mass; $Na_2O$: 0.08% by mass; $K_2O$: 1.16% by mass.

All in all, this resulted in the following composition of the batch in relation to the total mass of the batch:
MgO: 85.92% by mass
$Al_2O_3$: 10.47% by mass
$SiO_2$: 0.63% by mass
CaO: 2.09% by mass
$Fe_2O_3$: 0.35% by mass
$Na_2O$: 0.02% by mass
$K_2O$: 0.35% by mass
S: 0.17% by mass The batch was provided with a binder in the form of lignosulphonate in a proportion of 3.1% by mass, based on the batch without the binder, and then intimately mixed in a compulsory mixer so that, in particular, the sulphur of the sulphur comprising component was homogeneously distributed over the batch. The batch was then pressed into a green body, dried and finally fired at a temperature of 1,480° C. for a period of six hours so that the components of the batch sintered together. During the firing, the sulphur content of the ligninsulphonate evaporated completely, and the sulphur content of the other components of the batch evaporated by about 88% from 0.17% sulphur by mass to 0.02% sulphur by mass in the product. After cooling, a refractory ceramic product in the form of a refractory ceramic product according to the invention was available. The composition of the product was as follows:
MgO: 86.62% by mass
$Al_2O_3$: 10.31% by mass
$SiO_2$: 0.60% by mass
CaO: 2.01% by mass
$Fe_2O_3$: 0.38% by mass
$Na_2O$: 0.03% by mass
$K_2O$: 0.03% by mass
S: 0.02% by mass As a result of the intimate mixing of the components of the batch, the sulphur was present throughout the entire volume of the product. This provided very good protection against hydration of the product over its entire volume.

In order to quantitatively determine the extent of hydration protection by sulphur in the product, a common Angenot test was carried out, which is regularly used to assess the hydration resistance of basic refractory ceramic products. In an Angenot test, the product is exposed to a saturated water vapour atmosphere and the period of time until the visually perceptible destruction of the product is determined.

In the present case, the Angenot test was carried out as follows:

A product manufactured in accordance with the above exemplary embodiment was provided in the form of a cylindrical sample with a diameter and a height of 50 mm each. This sample was placed in a cylindrical vessel in which a water bath heated to 95° C. was formed. The sample was placed on a metal grid above the water bath. The vessel was then closed with a conical lid with a circular opening of about 2 cm in diameter. This created a saturated steam atmosphere around the sample. Subsequently, the time until the optically perceptible destruction of the sample was measured.

In this respect, the time it took to destroy the sample of the product in accordance with the invention was determined to be 142 hours.

In order to compare the resistance to hydration of the product in accordance with the invention according to the exemplary embodiment with a refractory ceramic product based on MgO according to the state of the art, a comparative test was made from such a product according to the state of the art and subjected to a corresponding Angenot test.

The product according to the state of the art was manufactured from a batch containing only the aforementioned basic component, namely 83% by mass sintered magnesia and 17% by mass magnesia spinel, based on the total mass of the batch.

All in all, this resulted in the following composition of this batch in relation to the total mass of the batch in accordance with the state of the art:
MgO: 86.8% by mass
$Al_2O_3$: 10.5% by mass
$SiO_2$: 0.8% by mass
CaO: 1.7% by mass
$Fe_2O_3$: 0.2% by mass
$Na_2O$: 0.0% by mass
$K_2O$: 0.0% by mass
S: <0.01% by mass This batch was further treated in accordance with the exemplary embodiment of the invention, as explained above, and sintered into a refractory ceramic product. A sample was obtained from this product, which was subjected to an Angenot tests described above in an identical manner.

The time required to destroy the sample was determined to be 39 hours.

Accordingly, the time it took to destroy the product could be more than tripled by the invention.

The invention claimed is:

1. A refractory ceramic product comprising the following features:
   the product is a sintered refractory product;
   the product has a proportion of MgO of at least 75% by mass;
   the product has a proportion of sulphur in the range from 0.01 to 0.20% by mass.

2. The product according to claim 1 having a proportion of sulphur in the range from 0.01 to 0.05% by mass.

3. The product according to claim 1, said product having a proportion of MgO in the range from 75 to 97% by mass.

4. The product according to claim 1, said product having a proportion of $Al_2O_3$ in the range from 1 to 20% by mass.

5. The product according to claim 1, said product having a proportion of CaO in the range from 0.5 to 3.0% by mass.

6. The product according to claim 1, said product having a proportion of $SiO_2$ below 1.5% by mass.

7. The product according to claim 1, said product having a proportion of $Fe_2O_3$ below 10% by mass.

8. The product according to claim 1, said product having a proportion of $Na_2O$ below 0.5% by mass.

9. The product according to claim 1, said product having a proportion of $K_2O$ of less than 0.2% by mass.

10. The product according to claim 1, said product having a proportion of the total mass of $Na_2O$ and $K_2O$ of less than 0.5% by mass.

* * * * *